Sept. 11, 1923.
E. L. THOMSON
DISTANT TRACTOR CONTROL
Filed Sept. 9, 1922
1,467,658
3 Sheets-Sheet 2
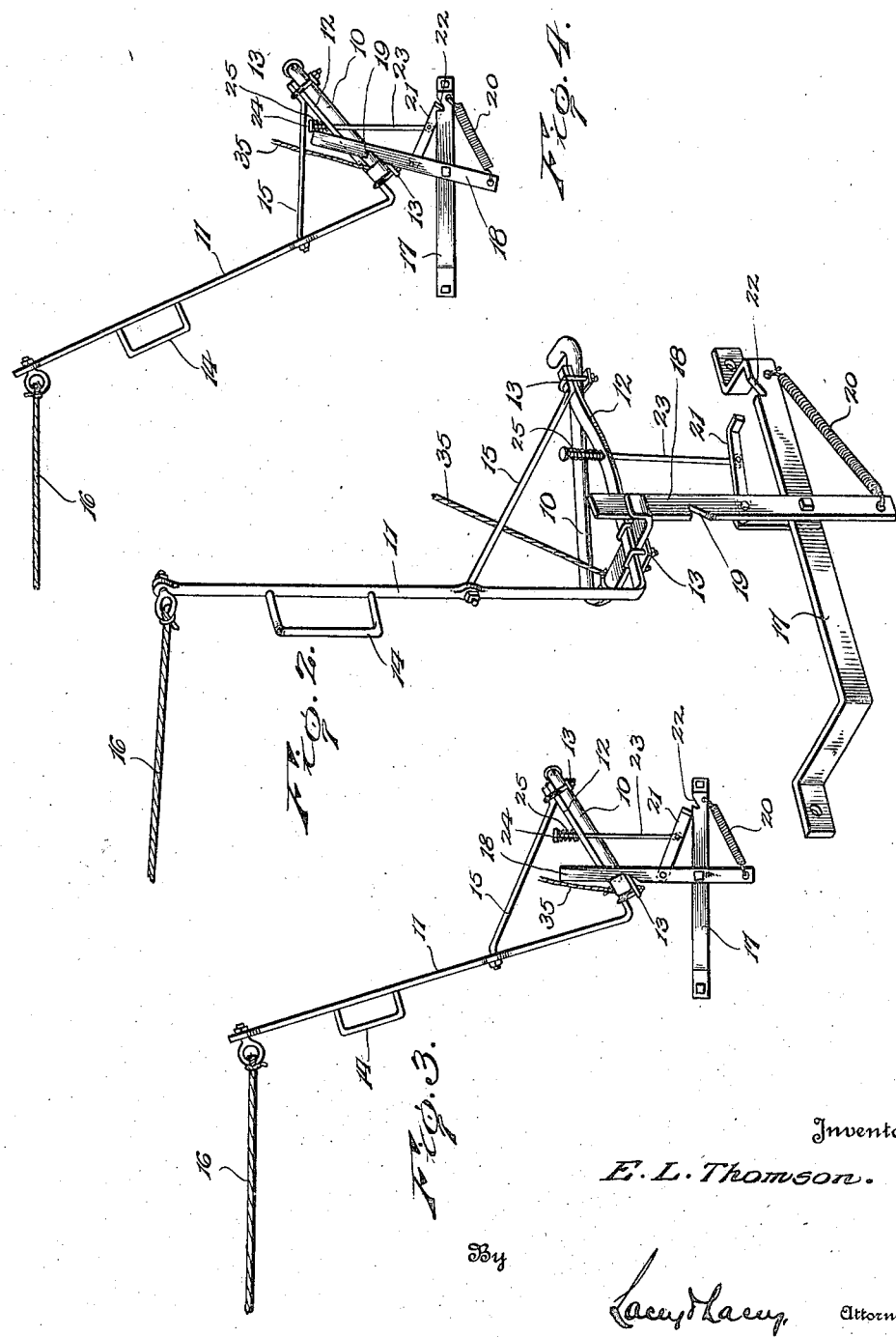

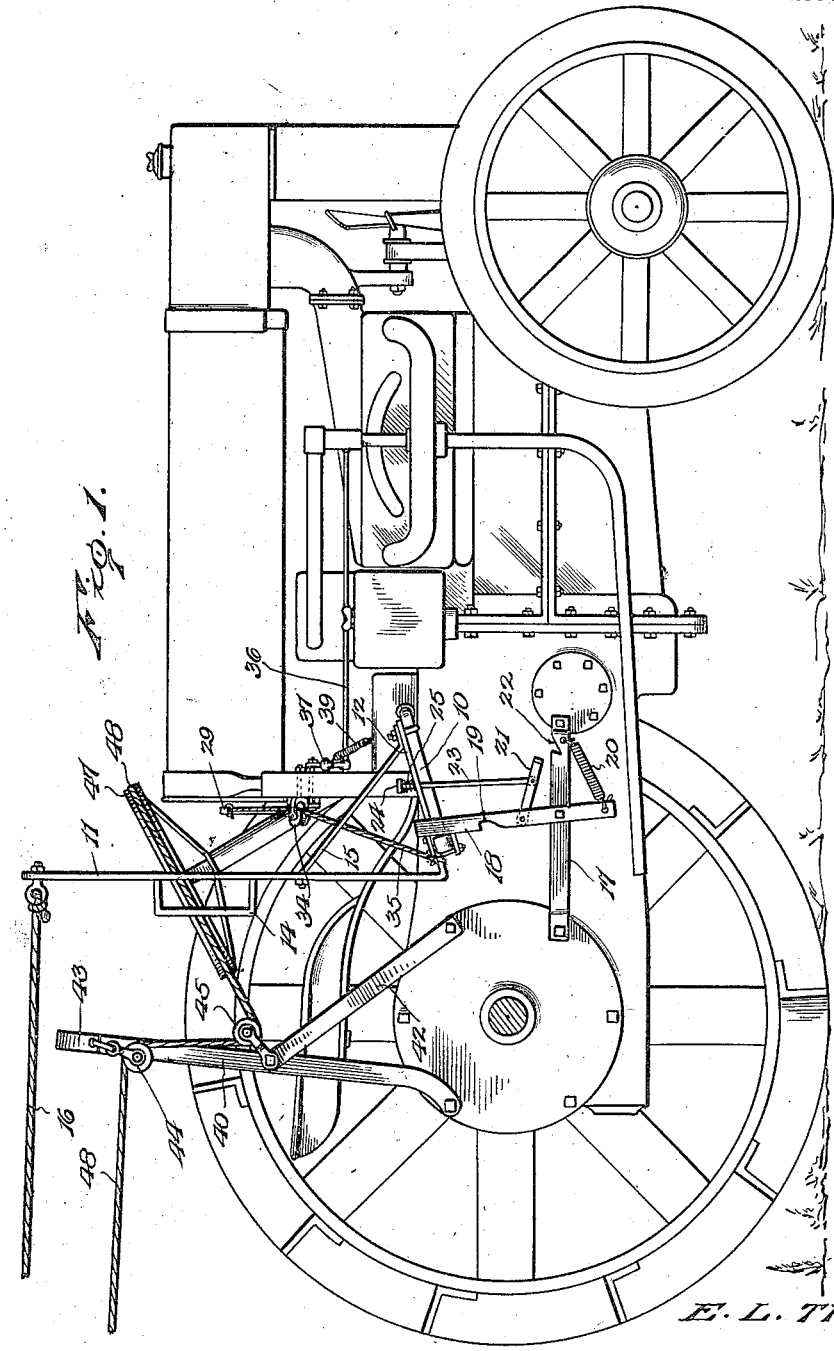

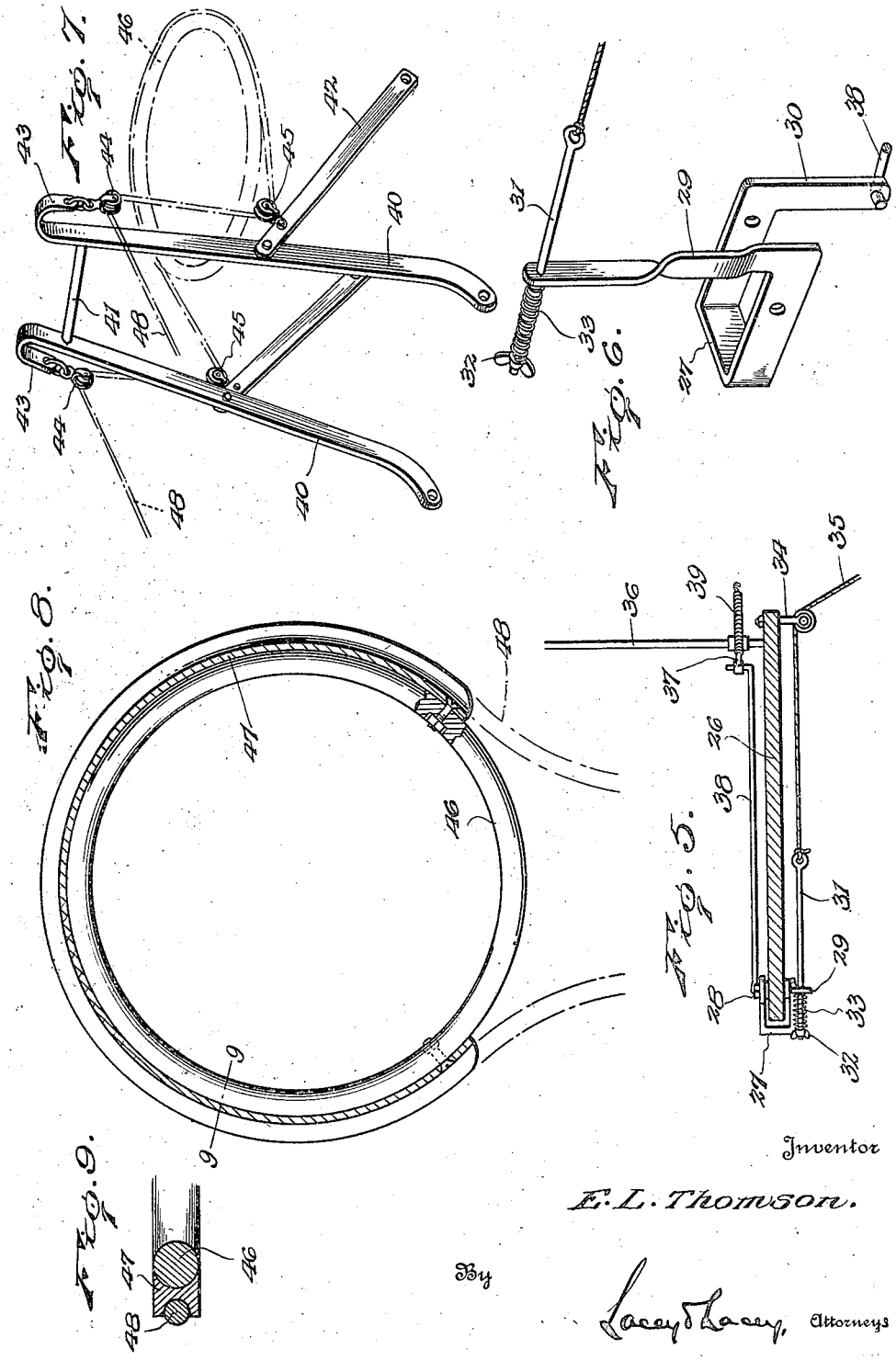

Patented Sept. 11, 1923.

1,467,658

UNITED STATES PATENT OFFICE.

EARL L. THOMSON, OF DUNKIRK, OHIO.

DISTANT TRACTOR CONTROL.

Application filed September 9, 1922. Serial No. 587,145.

*To all whom it may concern:*

Be it known that I, EARL L. THOMSON, a citizen of the United States, residing at Dunkirk, in the county of Hardin and State of Ohio, have invented certain new and useful Improvements in Distant Tractor Controls, of which the following is a specification.

This invention relates to an improved distant tractor control and seeks, as one of its principal objects, to provide a mechanism whereby a tractor may be operated and guided by a person riding upon a load pulled by the tractor.

A further object of the invention is to provide a mechanism wherein the clutch pedal of the tractor may be readily swung to disengage the clutch of the tractor for stopping the tractor and wherein means will be provided for automatically locking the pedal in such position.

Another object of the invention is to provide a mechanism wherein the clutch pedal may, after having been moved to disengage the clutch of the tractor, be readily released for movement to normal position so that the tractor may, when desired, be easily started.

Still another object of the invention is to provide a mechanism wherein, when the clutch pedal of the tractor is swung to stop the tractor, the throttle valve of the tractor engine will be coincidently shifted toward closed position for retarding the speed of the tractor engine and wherein when the clutch pedal is released for starting the tractor, the throttle valve will be again opened.

And the invention has as a still further object to provide a mechanism embodying means to cooperate with the steering wheel of the tractor for efficiently guiding the tractor.

Other and incidental objects will appear hereinafter.

In the drawings:

Figure 1 is a side elevation showing my improved tractor control in connection with a conventional tractor, Figure 2 is a perspective view showing the mechanism associated with the clutch pedal of the tractor for operating said pedal, Figure 3 is a view similar to Figure 2, showing the clutch pedal swung to disengage the clutch of the tractor, Figure 4 is a view similar to Figure 3, showing the manner in which the clutch pedal is released for movement to normal position, Figure 5 is a detail sectional view showing the mechanism employed for operating the throttle of the tractor engine coincident with the movement of the clutch pedal, Figure 6 is a detail perspective view particularly showing the dash lever of the throttle operating mechanism, Figure 7 is a detail perspective view showing the pulley bracket and mechanism employed in conjunction with the steering wheel of the tractor for guiding the tractor, Figure 8 is a detail sectional view particularly showing the channel member which is mounted upon the steering wheel to accommodate the flexible guiding member employed, and Figure 9 is a detail sectional view on the line 9—9 of Figure 8.

Referring now more particularly to the drawings, I have shown my improved control mechanism in connection with a Fordson tractor, the mechanism being particularly designed for use in connection with tractors of this make. However, I do not wish to be limited in this regard since, as will appear as the description proceeds, the mechanism is also well adapted for use upon other makes of tractors. The usual clutch pedal of the tractor is indicated at 10 and secured to the pedal is an upstanding lever 11 provided at its lower end with an arm 12 attached to the pedal, as particularly shown in Figure 2, by clamps 13. The arm is preferably provided near its upper end with a handle 14 and extending between the lower end portion of the arm and the foremost of said clamps is a brace 15. Connected with the arm at its upper end is a rope or other suitable flexible element 16 of a length to extend rearwardly from the tractor to the load to be pulled thereby. Thus, as will be seen, by pulling upon said rope, the lever 11 may be rocked for swinging the clutch pedal 10 downwardly to disengage the clutch of the tractor.

Bolted at one end to the pulley housing of the tractor and at its opposite end to the differential housing is a bracket 17, the usual bolts employed in conjunction with said housings being utilized for securing the bracket, and pivoted upon the bracket is an upstanding latch 18 in the upper end portion of which is formed a notch 19. Extending between the bracket and the lower end of said latch is a spring 20 holding the upper end portion of the latch against the stirrup of the clutch pedal. Pivoted upon the latch above the bracket is a detent 21 engageable at its free end in a notch 22 in the bracket and pivotally connected to said detent is a release rod 23 which extends upwardly through the arm 12 of the lever 11 and is provided at its upper end with a head 24, the rod being slidable through said arm. Bearing between the arm and said head is a spring 25 normally holding the latch elevated in inactive position.

As will now be seen in view of the foregoing, when the lever 11 is, as shown in Figure 3, rocked rearwardly for swinging the clutch pedal 10 downwardly to disengage the clutch of the tractor, the stirrup of the pedal will ride downwardly along the rear edge of the latch 18 until the stirrup reaches the notch 19 in said latch when the spring 20 will act to engage the latch with said stirrup, the shoulder on the latch formed by said notch engaging over the stirrup. Thus, the clutch pedal will be automatically locked depressed, so that the tractor, after having been stopped, may, without inconvenience, be permitted to stand. To release the clutch pedal, the lever 11 is, as shown in Figure 4, rocked further rearwardly by the rope 16 when the stirrup of the clutch pedal will ride out of the notch 19 of the latch 18 and, as the downward swinging of the pedal is continued, will engage the rear edge of the latch below said notch for rocking the upper end portion of the latch forwardly. Coincidently, the release rod 23 will be lowered, as the free end portion of the pedal descends, so that by the time the latch is swung forwardly to dispose the free end of the detent 21 at the notch 22 in the bracket 17, the free end of the detent will be also lowered to engage in said notch. Accordingly, when the rearward pull upon the rope 16 is released to permit upward swinging movement of the clutch pedal, the detent will hold the upper end of the latch against rearward movement under the influence of the spring 20 until the stirrup of the pedal has traveled past the notch 19 in the latch, the spring 25 upon the release rod being compressed as the upward travel of the clutch pedal progresses. However, after the stirrup of the clutch pedal has traveled past the notch 19, the tension upon said spring will become sufficient to raise the release rod 23 and accordingly again elevate the detent to inactive position so that as the clutch pedal completes its travel to normal position, the latch will be again freed to bear at its upper end against the stirrup of the pedal. Thus, as will be seen, the detent will function to temporarily lock the latch inactive and will be automatically released so that the latch will be freed to cooperate with the clutch pedal upon a repetition of the downward swinging of the pedal. After the lever 11 has been rocked rearwardly to effect the restraint of the latch by the detent, the pull upon the rope 16 may, of course, be slackened as desired so that the upward swinging of the clutch pedal may be easily regulated to effect a gradual engagement of the clutch of the tractor for starting the tractor.

The dash of the tractor is indicated at 26 and mounted thereon at the side of the tractor opposite the clutch pedal 10 is a lever 27. As best seen in Figures 5 and 6, this lever is formed with a U-shaped body portion straddling the adjacent edge of the dash and extending through the body portion of the lever and through the dash is a bolt 28 pivotally supporting the lever. Rising from one side of the body portion of the lever is an arm 29 extending at the rear of the dash and depending from the other side of the body portion of the lever is an arm 30 extending at the front of the dash. Slidable through the arm 29 at its upper end is an adjusting rod 31 upon which is threaded a wing nut 32 and bearing between said nut and the arm is a spring 33 surrounding the rod. Suitably mounted upon the dash near the edge thereof opposite the lever 27 is a pulley 34 and coacting with the pulley is a rope or other suitable flexible element 35 connected at the end to the inner end of the rod 31 and at its opposite end to the clutch pedal 10. The usual throttle rod of the tractor is indicated at 36, this rod being, as is well known, rotatable in a clockwise direction for opening the throttle of the tractor engine, and upstanding from the rod near its rear end is the customary arm 37. In conjunction with this arm I employ a rod 38 which is engaged at one end with the arm and at its opposite end with the depending arm 30 of the lever 27 coupling said lever with the rod 36, and secured at one end to the arm 37 is a spring 39, the opposite end of which is suitably anchored so that the spring will thus tend to rotate the rod 36 in a direction for opening the throttle.

As will now be readily understood, when the arm 11 is rocked by the rope 16 to disengage the clutch of the tractor, as previously described, the clutch pedal 10 will pull upon the rope 35 for rocking the lever 27 and accordingly rotating the rod 36 in a counter-clockwise direction so that the throttle of the tractor engine will be moved toward closed position. Accordingly, the speed of the tractor engine will be retarded coincidently with the disengagement of the clutch. On the other hand, when the pull upon the rope 16 is released, to free the clutch pedal and engage the clutch of the tractor for starting the tractor, the spring 39 will function to again open the throttle so that as the clutch is engaged, the speed of the tractor engine will be accelerated. The spring 33 will, of course, act to take up any slack in the rope 35 while by adjusting the nut 32, the effective length of the connection between the clutch pedal and the lever 27 may be varied for setting the throttle.

Mounted upon the differential housing of the tractor is a pulley bracket comprising spaced upwardly converging arms 40. At their lower ends, these arms are bolted to the housing by the usual bolts employed in conjunction with the housing and connecting the arms near their upper ends is a cross rod 41. Extending forwardly from the arms are braces 42 bolted at their lower ends to the housing by the customary bolts of the housing so that these braces will thus function to rigidly sustain the bracket in upright position. At their upper end portions, the arms 40 are bent outwardly and laterally to provide overhanging terminals 43 and connected to said terminals are pulleys 44 while similar pulleys 45 are mounted at the upper ends of the braces 42. The steering wheel of the tractor is indicated at 46 and bolted or otherwise secured at its ends to the rim of the wheel is a split channeled guide member 47 fitting the rim. Engaging said guide member to extend about the steering wheel is a rope or other suitable flexible element 48, the end portions of which are, as shown in dotted lines in Figure 7, trained over the pulleys 44 and 45, the rope 48 being of a length to extend rearwardly from the tractor to a load being pulled thereby. Accordingly, an operator riding upon the load may, by pulling first upon one end of the rope 48 and then upon the other end thereof, turn the steering wheel of the tractor in either one direction or the other for guiding the tractor, the rope being held under tension sufficient to maintain said rope in tight frictional engagement with the guide member 47. I accordingly provide a mechanism whereby the tractor may be stopped, started and guided by the operator riding upon the load while the speed of the tractor engine will be automatically controlled as the tractor is started or stopped.

Having thus described the invention, what is claimed as new is:

1. The combination with a tractor having a swingingly movable clutch pedal, of a lever connected to the pedal and operable for depressing the pedal, means for automatically locking the pedal when depressed, and means associated with the first means and operatively connected with the pedal for holding the first means inactive to release the pedal and operable by the pedal when released to free the first means.

2. The combination with a tractor having a swingingly movable clutch pedal, of a lever connected to said pedal and operable for depressing the pedal, a spring pressed latch riding against the pedal for automatically locking the pedal when depressed, a detent carried by the latch, and an operative connection between the detent and the pedal, the pedal being movable downwardly from depressed position for rocking the latch and rendering said detent active holding the latch inactive whereby the pedal may swing upwardly to cooperate with said connection for releasing the detent and freeing the latch.

3. The combination with a tractor having a swingingly movable clutch pedal, of a bracket, a spring pressed latch pivoted upon the bracket and bearing against the pedal for automatically locking the pedal when depressed, a detent carried by the latch, the pedal being movable downwardly from depressed position for rocking the latch and shifting the detent to engage said bracket holding the latch inactive whereby the pedal may swing upwardly, and an operative connection between the detent and the pedal for releasing the detent to free the latch upon upward movement of the pedal.

4. The combination with a tractor having a swingingly movable clutch pedal, of a lever having an arm secured to the pedal, the lever being operable for depressing the pedal, a bracket, a spring pressed latch pivoted upon the bracket and bearing against the pedal for automatically locking the pedal when depressed, a detent pivoted upon the latch, the pedal being movable downward from depressed position for rocking the latch and shifting said detent to engage the bracket holding the latch inactive whereby the pedal may swing upwardly, a rod connected to the detent and having slidable connection with said arm, and a spring bearing between the arm and rod to be brought under tension upon upward movement of the pedal for releasing the detent and freeing the latch.

5. The combination with a tractor having a swingingly movable clutch pedal, of a spring pressed latch operable to automatically lock the pedal when depressed, and a detent having operative connection with the latch and pedal, the pedal being movable from depressed position for rocking the latch and rendering the detent active locking the latch whereby the pedal may swing upwardly for automatically releasing the detent and freeing the latch.

6. The combination with a tractor having a clutch pedal and dash, of means for operating said pedal at a distance therefrom, a lever straddling the dash and pivoted thereon, said lever being provided with oppositely directed arms extending at opposite sides of the dash, an operative connection between one of said arms and the throttle of the tractor engine, and a flexible connection between the other of said arms and the pedal whereby the throttle will be moved toward closed position when the lever is depressed, the latter connection including a rod slidably adjustable upon the latter arm to vary the length of said flexible connection for setting the throttle, and means upon said rod for adjusting the rod with respect to the latter arm.

7. In a tractor control, means to engage the clutch pedal of a tractor when said pedal is depressed, means for holding said first mentioned means inactive to free the pedal for return movement, and an operative connection between the pedal and said second mentioned means for releasing said second mentioned means upon return movement of the pedal.

8. In a tractor control, a pivoted latch to engage the clutch pedal of a tractor when said pedal is depressed, a detent for holding the latch inactive to free the pedal for return movement, and an operative connection between the pedal and said detent for releasing the detent upon return movement of the pedal.

9. In a tractor control, a pivoted latch to engage the clutch pedal of a tractor when said pedal is depressed, a detent for holding the latch inactive to free the pedal for return movement, and an operative connection between the pedal and said detent including a spring adapted to be brought under tension for releasing the detent upon return movement of the pedal.

In testimony whereof I affix my signature.

EARL L. THOMSON. [L. S.]